Dec. 7, 1954   G. H. BENDIX ET AL   2,696,589
MEANS FOR DETECTING SCRATCHES IN LACQUER COATINGS
Filed April 18, 1952   4 Sheets-Sheet 1
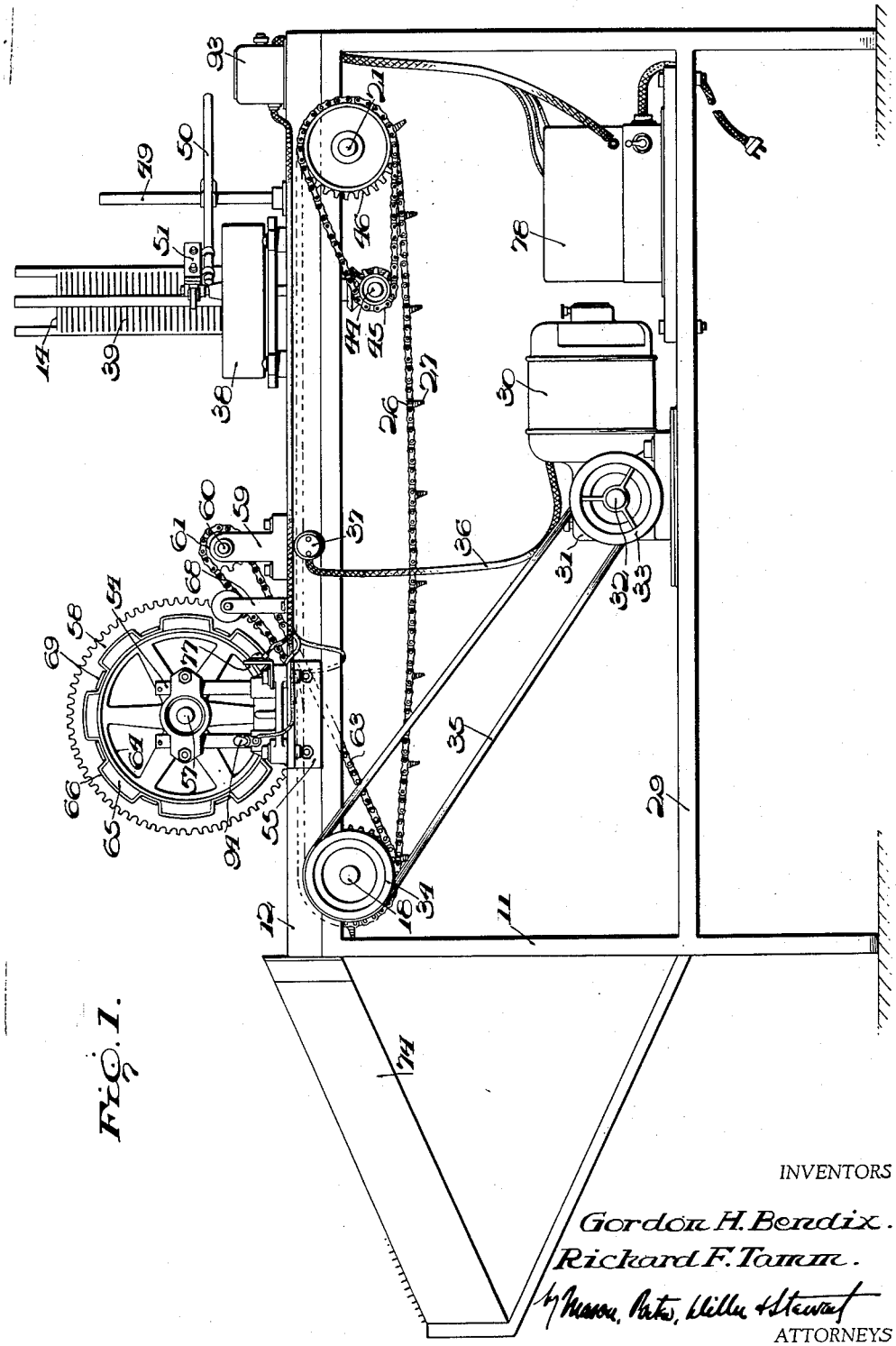
INVENTORS
Gordon H. Bendix.
Richard F. Tamm.
by Mason, Porter, Miller & Stewart
ATTORNEYS Dec. 7, 1954  G. H. BENDIX ET AL  2,696,589
MEANS FOR DETECTING SCRATCHES IN LACQUER COATINGS
Filed April 18, 1952  4 Sheets-Sheet 2
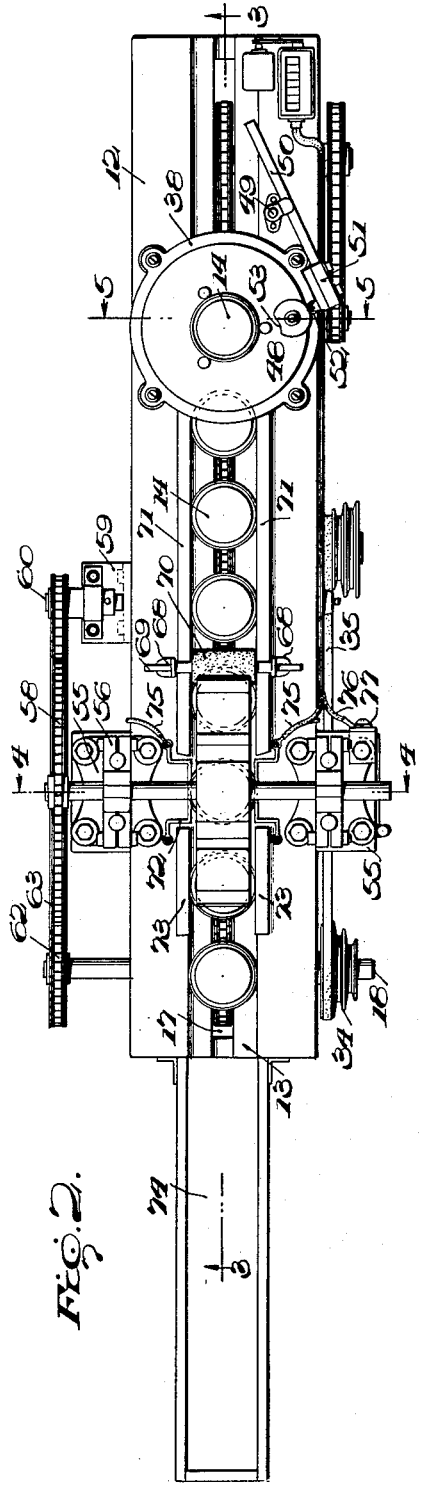
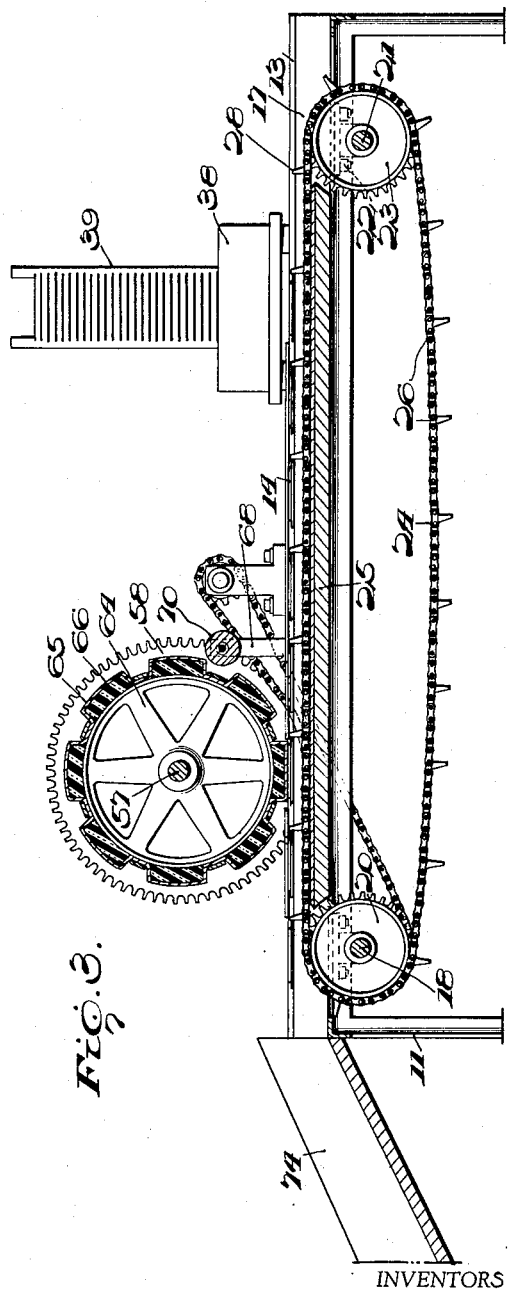
INVENTORS
Gordon H. Bendix.
Richard F. Tamm.
BY Mason, Porter, Miller & Stewart
ATTORNEYS

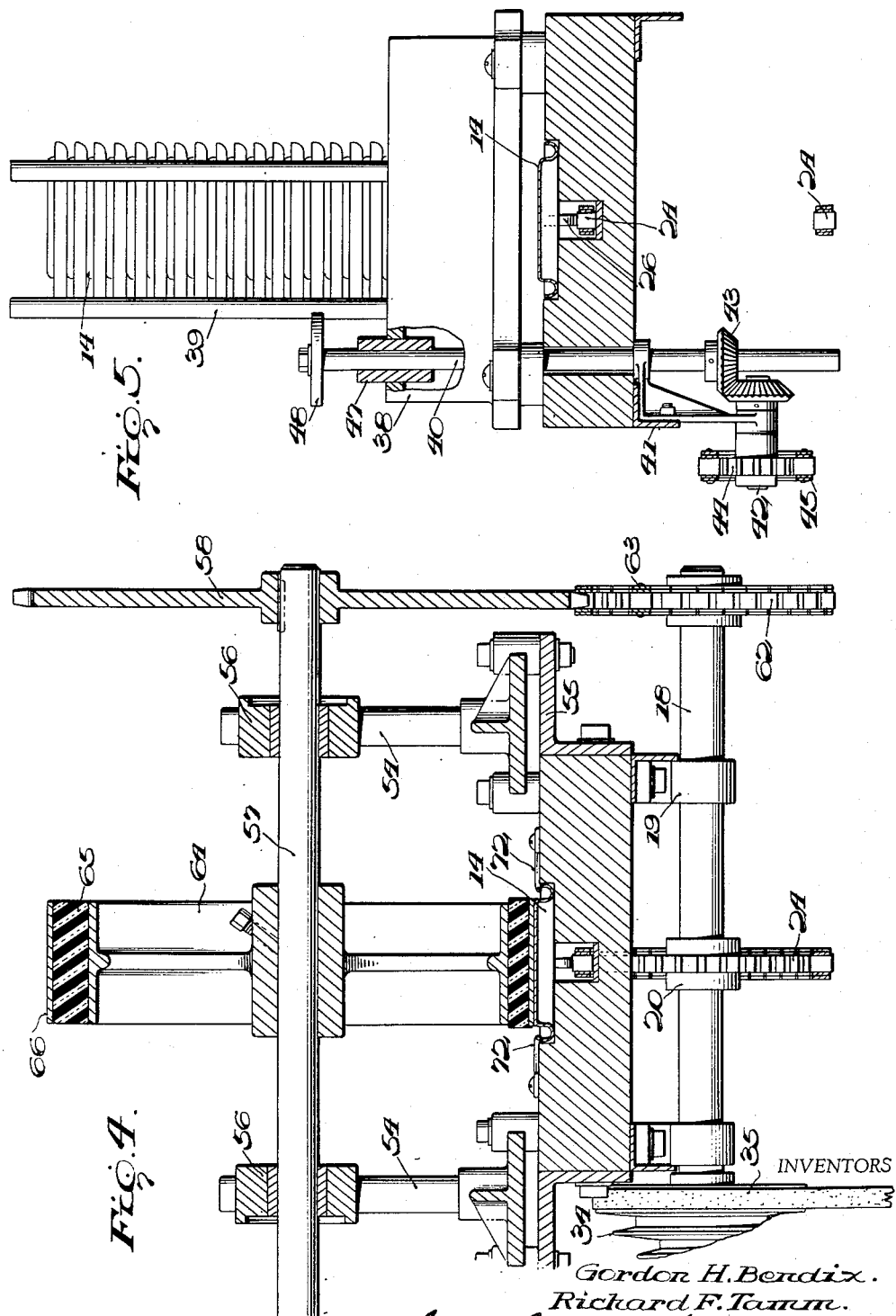

Dec. 7, 1954  G. H. BENDIX ET AL  2,696,589
MEANS FOR DETECTING SCRATCHES IN LACQUER COATINGS
Filed April 18, 1952  4 Sheets-Sheet 4
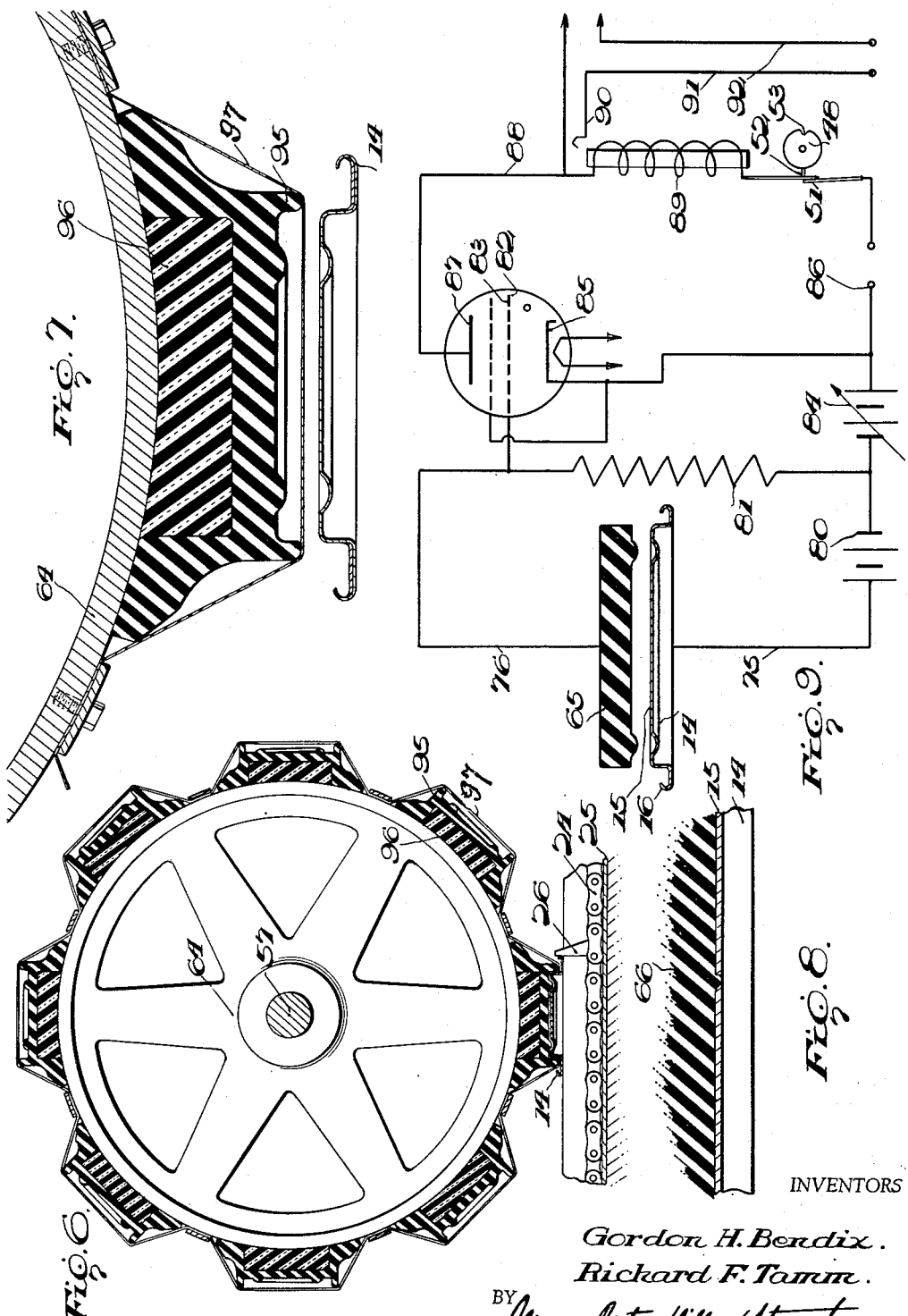
INVENTORS
Gordon H. Bendix.
Richard F. Tamm.
BY Mason, Porter, Miller & Stewart
ATTORNEYS

United States Patent Office 2,696,589
Patented Dec. 7, 1954

2,696,589

MEANS FOR DETECTING SCRATCHES IN LACQUER COATINGS

Gordon H. Bendix, Park Ridge, and Richard F. Tamm, Chicago, Ill., assignors to Continental Can Company, Inc., New York, N. Y., a corporation of New York Application April 18, 1952, Serial No. 283,052

10 Claims. (Cl. 324—54)

The following specification sets out in detail novel improvements in detectors for imperfect, lacquered can ends.

In packaging foods and beverages in cans, great importance attaches to the completeness with which interior surfaces of the receptacles are coated with a protective lacquer. In the final processing of the foods or beverages it is customary to close the open end of a filled can with a can end and thereafter seal the receptacle with a seam around the closed end. It has been found that imperfections in the lacquer coating are most apt to occur in the can ends. This is due to the mechanical operations by which they are formed, and the handling necessary in the operations of applying the can ends.

The protective lacquer on the interior of the can or can end, may suffer minor and apparently inconsequential scratches, perforations, or other inperfections. While this is hardly perceptible to an observer, liquid contents of the can may penetrate the lacquer coating and cause deterioration of the inner surface of the can. Incidentally, this may also result in impairing the taste, color or other properties of the contents.

We have observed that seemingly minor scratches of the lacquer coating become readily noticeable by measurement of the electrical resistance possessed by the lacquered surface. Utilizing a direct current potential and measuring the cumulative leakage over the entire lacquered inside surface of the can end, and a contact pad of 500 ohms resistance, the following differences were observed:

| Type of End | Resistance Using 500 Ohm Pad |
|---|---|
| | Ohms |
| Scratch—0.005 x 1 inch | 3,000 |
| Scratch—0.005 x 0.15 inch | 15,000 |
| Scratch—0.005 x 0.02 inch | 35,000 |
| Coating continuous but appears marred | 3,000,000 |
| No visible defect | 35,000,000 |
| Best end noted | 500,000,000 |

From this it is clear that the resistance remains high as long as there is no defect in the lacquer coating. However, where the coating is continuous but appears to be marred, the resistance drops to practically one eleventh of the normal. Further, where a scratch is of very slight width, and only two one hundredths of an inch long, the resistance falls to an even greater extent relative to the normal. Any increase in the length of the scratch effects a correspondingly great reduction in electric resistance.

This relation is utilized by our invention in readily detecting the presence of metal exposure, even though extremely small.

One of the objects of our invention is to make use of the cumulative electrical leakage over the entire inner surface of a lacquered can end to determine the presence of minor imperfections, such as scratches.

It is a further object of our invention to register the presence of scratches or imperfections in the lacquered surface in such a manner as to produce a signal which may be observed by the operator or may actuate the mechanical counting of scratched articles or their separation from the acceptable ones.

It is a further object of our invention to carry out the above process at a high rate of speed commensurate with the rate at which can ends are produced.

It is a still further object of our invention to provide mechanism by which the presence of one or more scratches on the lacquered inner surface of a can end give indications of their presence.

Among the objects of our invention is also to provide a mechanism by which the indication from each scratch will be combined with those from other scratches, so that the final indication will be the sum total of all imperfections in the can end being tested.

In the practical embodiment of our invention, mechanism is arranged to rapidly test individual can ends and register the presence of scratches or other imperfections.

Other incidental advantages of our invention will also be evident from the following description of the process and the embodiment by which it is practiced as illustrated by way of example in the accompanying drawings in which Fig. 1 is a side elevation of the improved machine for detecting scratches on lacquered can ends;

Fig. 2 is a plan view of the same;

Fig. 3 is a longitudinal vertical section of the machine taken on the line 3—3 of Fig. 2;

Fig. 4 is an enlarged transverse vertical section on the line 4—4 of Fig. 2;

Fig. 5 is an enlarged transverse vertical section of the cam operated timing switch taken on the line 5—5 of Fig. 2;

Fig. 6 is an enlarged vertical sectional detail in the plane of Fig. 2, of an alternative form of the invention;

Fig. 7 is a similar fragmentary sectional view showing the can end out of engagement with the conducting pad;

Fig. 8 is a vertical section of parts of the can end and conducting pad in engagement and Fig. 9 is a wiring diagram of the electric circuits provided.

Briefly considered, the invention consists in rapidly advancing individual can ends with the lacquered inner surface uppermost through a testing station. Each can end is successively made a part of an electric circuit. At the same time the circuit is closed through an electrode which is also a part of the circuit and is brought into conducting relation with the lacquered inner surface over its entire area. Leakage of electric current through even the smallest scratch or other imperfections in the lacquered coating is then detected to indicate the defect in the coating, and if desired, to actuate mechanism for deflecting or separating such imperfect ends from the remainder.

In the drawings we have shown the preferred embodiment of the improved mechanism by which the operation is carried out.

The mechanism is assembled upon a table 11 which has a flat top 12. The portion of the top where the testing is carried out is of electrically insulating material, such as dry, treated wood, composition board, and the like. The table top has a longitudinal track 13 which is slightly depressed beneath the level of the table. Can ends 14 are advanced along the track with their inner lacquered surfaces 15 substantially flush with the level of the table.

The can end is also provided with the usual curled rim 16, a little less wide than the general thickness of the end.

The track 13 has a longitudinal central channel or passageway 17. At one end of the table there is a transverse drive shaft 18 carried in bearings 19 on the lower surface of the table top. This drive shaft has a sprocket 20 mounted centrally and projecting upwardly through the table top into the channel 17.

The opposite end of the top 12 has a similar transverse idle shaft 21 journaled in bearings 22 beneath the top of the table. This shaft also has a central sprocket 23 which extends upwardly into the channel 17 at this point.

An endless chain conveyer 24 is trained over the sprockets 20 and 23. In its upper flight the conveyor 24 travels through the channel 17 where it is supported by a shoe 25.

At regular intervals the conveyor 24 is equipped with a series of dogs 26. These dogs are formed by upstanding screws 27 mounted on spaced chain elements. Each screw 27 has a fiber insulation sleeve 28. The dogs 26 and the fiber insulating sleeves project above the channel 17 and into the plane of the track 13.

The table 11 has a lower shelf 29 upon which is mounted an electric motor 30 equipped with reduction gearing 31 and a countershaft 32. This countershaft is equipped with sheaves 33 of graduated diameters.

The drive shaft 18 is extended at one end to provide for a pulley 34 likewise having a plurality of diameters.

A belt 35 runs between the sheaves 33 and pulley 34, being thus adapted for varying the speed of rotation of the latter.

The motor 30 is connected by conductor 36 and switch 37 to any convenient source of electric power.

At one end of the table there is provided a feeder 38 for can ends. These can ends are held in a stack 39 over the conveyor 24. The ends 14 are fed singly by means of continuous screw feeds, so that one can end is released to fall into position on the track 13 in advance of each dog 26. Permanent magnets (not shown) are placed under the feed stack to keep the ends from bouncing.

A drive shaft 40 is provided to actuate the feeder 38. The shaft 40 extends vertically through the table top. Beneath the table top it is held in a bearing bracket 41. The bearing bracket also carries a countershaft 42 connected to the drive shaft 40 by means of a pair of miter gears 43. The countershaft has a sprocket 44 connected by means of chain 45 to a sprocket 46 on one end of the idle shaft 21. In this manner, the feed of the individual can ends is timed with the travel of the dogs on the conveyer chain.

The shaft 40 passes through the housing of the feeder 38 through a bushing 47. Above the bushing, the shaft 40 carries a recessed cam 48.

Adjacent to the end feeder, the table top supports a post 49. This post carries a horizontal bar 50, upon the end of which is mounted a normally open switch 51. This switch 51 has a pivoted bar 52 with a roll which is in the path of travel of the cam 48 and the cam actuates the bar 52 of the switch. The cam 48 thus holds the bar 52 in an advanced position and the switch closed until such time as the roll and bar 52 are released to fall into the recess 53 of the cam. At such moment the switch is open and the voltage normally impressed on the plate of the Thyratron tube is removed to reset the detecting system. The high part of the cam is positioned to move bar 52 and close switch 51 when a can end is in position to be tested for scratches.

The detecting mechanism proper is mounted upon two pairs of standards 54, 54. These rise from flange plates 55, 55 on each side of the table top. Each pair of standards 54 is equipped with a crosshead bearing 56, 56. A horizontal transverse shaft 57 is carried on the bearings 56, 56. On one side, the shaft 57 is extended to carry a large sprocket 58.

On the same side of the table with the large sprocket 58, there is provided a side bracket 59. This carries a small jack shaft 60 with a sprocket 61 in the same vertical plane with the large sprocket 58.

Drive shaft 18 is also extended on the same side of the table to form a mounting for a sprocket 62. A drive chain 63 from sprocket 62 rides underneath large sprocket 58 and over sprocket 61, thence returning to sprocket 62. Shaft 57 is thus caused to rotate in timed sequence with the drive shaft 18 and the endless chain conveyer 24.

Shaft 57 has a keyed drum 64 which is in the same vertical plane with the endless conveyer 24 and above it.

The drum 64 is provided on its periphery with a series of spaced, resilient pads 65. These pads are preferably made of sponged rubber, although other material of like resilience may be substituted.

Each pad 65 is covered with a flat sheet or layer 66 of rubber or the like. These rubber sheets are of good electric conductivity, so that electric current will pass readily through them. Each rubber sheet is fastened firmly to the periphery of the drum 64 by means of bolts, or the like.

Each pad 65 and covering sheet 66 is of the same length as the diameter of an end 14. It is also of the same width. Thus a sheet 66 will substantially completely cover a can end 14 as it is advanced under the drum 64. (Fig. 4).

Somewhat in advance of the drum 64 the table carries a pair of posts 68, 68. A shaft 69 is journaled on the posts 68, 68 and extends transversely of the drum 64. An absorbent roll 70 of felt or like material is carried on the shaft 69. This roll is kept moistened with water or similar wetting liquid, either manually or mechanically.

Moisture applied thus to the surfaces of the pads increases the conductivity of the surfaces. In addition this moisture will penetrate the most minute scratch where the rubber cannot go, thus making a better electrical contact and increasing the observable amount of current leakage through the scratch.

The side edges of the track 13 carry guides or curbs 71. These curbs overhang the track for a short distance and also hold down the lateral edge portion of the rims of the can ends. These curbs 71 extend from the cam end receiving mechanism 38 to a position near the shaft 57. The area of the table immediately near the shaft 57 is of insulating material and for a distance slightly greater than the diameter of the can end 14 is provided with a pair of resilient conducting rails or shoes 72, 72. The mid-portions of the rails are depressed into the track 13 where they press down upon the rim 16 or cut edge of the can end 14. (Fig. 4).

Beyond the conducting rail 72 there is a pair of curbs 73, 73 overhanging the track 13 and maintaining an orderly advance of tested can ends.

The table extends far enough beyond the testing or detecting mechanism to permit the can ends to be removed from the chain conveyer when found imperfect and the speed permits. It is also feasible to provide the table at this point with mechanical means for removing ends which have been tested and found to permit current leakage by reason of scratches.

Can ends which have satisfactory lacquer coatings and thus do not actuate the detecting mechanism are delivered by the chain conveyer 24 to a chute 74.

The spring wire conducting rails 72 are connected by insulated wires 75, 75 to one side of the detecting electric circuit. The other wire 76 of the circuit is attached to a terminal 77, shown on Fig. 2 as mounted on a flange plate 55.

In this way current applied to the cut edge of the rim of each end 14 will leak through any existing scratch or other imperfection of the can end to a corresponding sheet 66.

The current then passes through the drum 64, shaft 57, standard 54, flange plate 55 and wire 76.

On Fig. 1 we have shown a housing 78 for a detecting mechanism. This is shown diagrammatically on Fig. 9 to include a direct current source 80 for the current in the lines 75 and 76. When current leaks through a scratched or defective coating 15 of the end 14 to the pad 66 current flows in the resistor 81 of the circuit.

An electronic relay tube 82 such as a Thyratron has its grid 83 connected to the resistor 81. Voltage is also applied from a variable D. C. source 84 to the cathode 85 of the relay tube.

A third source of D. C. voltage 86 is imposed on the plate 87 of the relay tube. The circuit 88 for the plate includes the micro-switch 51, above described and a solenoid 89.

The solenoid operates a switch 90 in a work circuit consisting of a lead wire 91 and a lead wire 92. This circuit may include one or more of a wide variety of instrumentalities.

Thus on Fig. 1 we have shown a counting device 93 which registers the number of times a scratched end closes the actuating circuit as it moves under the drum.

In like manner the work circuit has been shown as including a neon or other signal light 94 mounted on the table convenient to the operator. He may then remove the defective end as it is brought beyond the drum by the endless conveyer.

The signal circuit may actuate known mechanical means for diverting the scratched ends before they are delivered to the chute 74.

In the diagram of Fig. 9 no showing has been made of the contacting sheet 66 as this is an obvious detail.

Due to the irregular surface of the ends being inspected for scratches, the pads 65 are subject to material wear. It is moreover difficult to effect complete contact between the pads and the ends.

Even when the surfaces of the pads are molded to conform to the surfaces of the ends the results are apt to be irregular and incomplete. Such molded surfaces have been given the pads 95 in the form illustrated in Figs. 6 and 7.

To insure complete extensive contact with the surface of the can end, the pad 95 is backed by a sponge rubber base 96 which gives added resilience. The pad itself is of conductive rubber molded to conform to the inner surface of the can end. The pad 95 is covered by a taut cloth fabric sheet 97.

As the fabric sheet is kept damp by periodic contact with the wet roller 70, the sheet is brought into continuous contact with the surface of the can end regardless of the conformation of the latter since the corresponding surface of the pad 95 presses the sheet 97 down at all points. In particular the sheet is brought into contact with the vertical portions as shown in Fig. 6.

It has been found that the dampened cloth improves the electrical conductivity.

Also the cloth sheet is not subject to the wear suffered by the pad 95. Hence the sheet not only protects the surface of the pad but eliminates the wear on it.

In brief the operation of the mechanism is that the can ends are delivered singly to the endless conveyer with their inner surfaces uppermost.

The ends are advanced under the drum where the dampened conducting sheet 97 or pad 95 presses against the surface being tested.

Any leakage current passing through the can end to the pad and drum will energize the electric relay and actuate a circuit which may be the neon signal, a counting device or a transfer mechanism for the defective end. Two or all of these effects may be caused simultaneously.

The relay circuit is opened for re-setting by the micro switch 51 once for each can end being advanced.

The voltage source 84 is adjusted so that it will require a predetermined amount of leakage and current flow to actuate the plate circuit, 86, 87, 88 and 89. The sensitivity of the relay circuit is therefore improved and controlled. The work circuit 91, 92 is likewise under control.

The testing of can ends is thus expedited and at the same time the tests are made materially more sensitive by the use of the mechanical features above outlined.

While the preferred form of the invention has been illustrated and described by way of example, many changes can be made in minor details of materials, sizes and proportions within the scope of the invention as defined in the following claims.

What we claim is:

1. Means for detecting scratches and similar flaws in the lacquered surface of a sheet metal can end which comprises a movable conveyer, a feeder of the can ends individually to the conveyer with one surface exposed, a drum, driving means for moving the conveyer and drum in unison, a series of conducting pads carried by the drum into contact with the can ends, an electrical circuit having a connection supplying one electrical potential to the drum and pads and a second connection supplying a different potential to the contacted can ends and a register in the circuit for indicating a predetermined current flow.

2. Means for detecting scratches and similar flaws in the lacquered surface of a sheet metal can end which comprises a movable conveyer, a feeder of the can ends individually to the conveyer with one surface exposed, a drum, driving means for moving the conveyer and drum in unison, a series of conducting pads carried by the drum into contact with the can ends, a direct current circuit having a connection supplying one electrical potential to the drum and pads and a second connection supplying a different potential to the contacted can ends, a relay in the circuit operable on the flow of a predetermined current and a work circuit actuated by the relay.

3. Means for detecting scratches and similar flaws in the lacquered surface of a sheet metal can end which comprises an endless conveyer, a feeder of the can ends individually to the conveyer with one surface exposed, a drum, driving means for rotating the conveyer and drum in unison, a series of conducting pads carried by the drum into contact with the surfaces of the can ends, a direct current circuit having a connection supplying one electrical potential to the drum and pads and a second connection supplying a different potential to the contacted ends and a register in the circuit for indicating a predetermined current.

4. Means for detecting scratches and similar flaws in the lacquered surface of a sheet metal can end which comprises an endless conveyer, a feeder of the can ends individually to the conveyer with one surface exposed, a drum, driving means for rotating the conveyer and drum in unison, a series of conducting pads carried by the drum into contact with the surfaces of the can ends, a moistening roller in the path of the pads, a direct current circuit having a connection supplying one electrical potential to the drum and pads and a second connection supplying a different potential to the contacted ends and a register in the circuit for indicating a predetermined flow.

5. Means for detecting scratches and similar flaws in the lacquered surface of a sheet metal can end which comprises an endless conveyer, a feeder of the can ends individually to the conveyer with one surface exposed, a drum, driving means for rotating the conveyer and drum in unison, a series of conducting pads carried by the drum with surfaces complementary to those of the can ends and movable into extended contact with the surfaces of the can ends, a direct current circuit having a connection supplying one electrical potential to the drum and pads and a second connection supplying a different potential to the contacted ends and a register in the circuit for indicating a predetermined flow.

6. Means for detecting scratches and similar flaws in the lacquered surface of a sheet metal can end which comprises an endless conveyer, a feeder of the can ends individually to the conveyer with one surface exposed, a drum, driving means for rotating the conveyer and drum in unison, a series of conducting pads carried by the drum with surfaces complementary to those of the can ends, flexible sheets covering the pads and pressed thereby into extended contact with the surfaces of the can ends, a direct current circuit having a connection supplying one electrical potential to the drum and pads and a second connection supplying a different potential to the contacted ends and a register in the circuit for indicating a predetermined flow.

7. Means for detecting scratches and similar flaws in the lacquered surface of a sheet metal can end which comprises an endless conveyer, a feeder of the can ends individually to the conveyer with one surface exposed, a drum, driving means for rotating the conveyer and drum in unison, a series of conducting pads carried by the drum into contact with the surfaces of the can ends, a direct current circuit having a connection supplying one electrical potential to the drum and pads and a second connection supplying a different potential to the contacted ends, a register in the circuit for indicating a predetermined flow, and a circuit interrupter for restoring the open circuit condition in timed relation to the feeding of the can ends.

8. Means for detecting scratches and similar flaws in the lacquered surface of a sheet metal can end which comprises a table having an insulating section, an endless conveyer traversing said section, a feeder for can ends individually to the conveyer with one surface exposed, a drum, driving means for rotating the conveyer and drum in unison, a series of conducting pads carried by the drum into contact with the surfaces of the can ends, conducting rails on the insulating section opposite the drum for engagement with the edges of the can ends, a direct current circuit having a connection supplying one electrical potential to the drum and pads and a second connection supplying a different potential to the said rails, and a register in the circuit for indicating a predetermined current flow.

9. Means for detecting scratches and similar flaws in the lacquered surface of a sheet metal can end which comprises a movable conveyer, a feeder of the can ends individually to the conveyer with one surface exposed, a drum, driving means for moving the conveyer and drum in unison, a series of conducting pads carried by the drum into contact with the can ends, a direct current circuit having a connection supplying one electrical potential to the drum and pads and a second connection supplying a different potential to the contacted can ends, an adjustable relay in the circuit operable on the flow of a predetermined current, a work circuit actuated by the relay and a switch in the relay circuit to re-set the relay between successive tests.

10. Means for detecting scratches and similar flaws in the lacquered surface of a sheet metal can end which comprises a movable conveyer, a feeder of the can ends individually to the conveyer with the lacquered surface exposed, a drum, driving means for moving the conveyer and drum in unison, a series of pads carried by the drum into contact with the can ends, and scratch-indicating means responsive to the cumulative effect of scratches in the lacquered surface of each contacted can end.

References Cited in the file of this patent

UNITED STATES PATENTS

| Number | Name | Date |
| --- | --- | --- |
| 1,953,155 | Currier | Apr. 3, 1934 |
| 1,957,222 | Mershon | May 1, 1934 |
| 2,379,947 | Bandur | July 10, 1945 |
| 2,572,597 | Connor | Oct. 23, 1951 |
| 2,587,664 | Stout | Mar. 4, 1952 |
| 2,592,260 | Emerson et al. | Apr. 8, 1952 |
| 2,608,604 | Hart | Aug. 26, 1952 |
| 2,653,298 | McKinley | Sept. 22, 1953 |
| 2,663,844 | Earle et al. | Dec. 22, 1953 |